US009123014B1

(12) United States Patent  
Erdmann et al.

(10) Patent No.: US 9,123,014 B1  
(45) Date of Patent: *Sep. 1, 2015

(54) PREDICTING LOCATION OF A MOBILE USER

(71) Applicant: Amazon Technologies, Inc., Reno, NV (US)

(72) Inventors: David James Roy Erdmann, Edmonds, WA (US); Joseph Patrick Pinsky, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,543

(22) Filed: Apr. 22, 2014

Related U.S. Application Data

(63) Continuation of application No. 12/884,726, filed on Sep. 17, 2010, now Pat. No. 8,498,817, and a continuation of application No. 13/952,979, filed on Jul. 29, 2013, now Pat. No. 8,718,934.

(51) Int. Cl.  
*G01C 21/00* (2006.01)  
*G06Q 50/28* (2012.01)  
*G06Q 10/08* (2012.01)  
*G01C 21/36* (2006.01)  
*H04W 4/02* (2009.01)

(52) U.S. Cl.  
CPC .......... *G06Q 10/083* (2013.01); *G01C 21/3617* (2013.01); *H04W 4/028* (2013.01)

(58) Field of Classification Search  
CPC .. G01C 21/3617; H04W 4/028; G06Q 10/083  
See application file for complete search history.

(56) References Cited

U.S. PATENT DOCUMENTS

| 7,130,743 | B2 | 10/2006 | Kudo et al. |
| 8,706,131 | B2* | 4/2014 | Winters ................ 455/452.2 |
| 2003/0125963 | A1 | 7/2003 | Haken |
| 2007/0219708 | A1 | 9/2007 | Beasche et al. |
| 2007/0294030 | A1 | 12/2007 | Jones |
| 2008/0125959 | A1 | 5/2008 | Doherty et al. |
| 2009/0012802 | A1 | 1/2009 | Pinney |
| 2010/0178928 | A1 | 7/2010 | O'Reilly |
| 2012/0047102 | A1 | 2/2012 | Petersen et al. |

* cited by examiner

*Primary Examiner* — Michael J Zanelli  
(74) *Attorney, Agent, or Firm* — Thomas | Horstemeyer, LLP

(57) ABSTRACT

Disclosed are various embodiments for predicting a future location of a mobile user. A recent location of a mobile user is received. Past location data for the mobile user is retrieved from storage. A future location of the mobile user is predicted based at least in part on the recent location and on the past location data. The prediction is provided in response to a query or by subscription.

20 Claims, 5 Drawing Sheets

PREDICTING LOCATION OF A MOBILE USER

CROSS REFERENCE TO RELATED APPLICATION

This application is a continuation of and claims the benefit of both co-pending U.S. patent application Ser. No. 13/952,979, filed Jul. 29, 2013, entitled "PREDICTING LOCATION OF A MOBILE USER," as well as U.S. patent application Ser. No. 12/884,726, filed Sep. 17, 2010, now U.S. Pat. No. 8,498,817, entitled "PREDICTING LOCATION OF A MOBILE USER," both of which are incorporated herein by reference in their entireties.

BACKGROUND

At the present time, various package delivery services provide different options for delivering a package to a user. The options include, for example, next day or overnight delivery, and may even include delivery within a few hours if the shipper and recipient are located in the same geographic area. Existing delivery services rely on delivery to a particular location rather than to a particular person. That is, existing delivery services use a location such as home or office as a proxy for the actual location of the delivery target. However, a significant delay in getting the package to the recipient can occur when the package is delivered to one location (e.g., recipient's home) but the recipient is not at that location and does not return for several hours or even days.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to tracking a recent location of a mobile user and predicting the mobile user's future location based on the recent location and contextual location data for this user. The contextual location data may include various types of information about the mobile user, such as a calendar, a trip itinerary, and/or location information about other users who act as a proxy for the mobile user. The mobile user's predicted location may be used to provide convenient delivery of a package to the mobile user as he moves from one location to another. The package shipper and/or mobile user may be charged different prices for various delivery modes, levels of convenience, etc.

Figure 1:
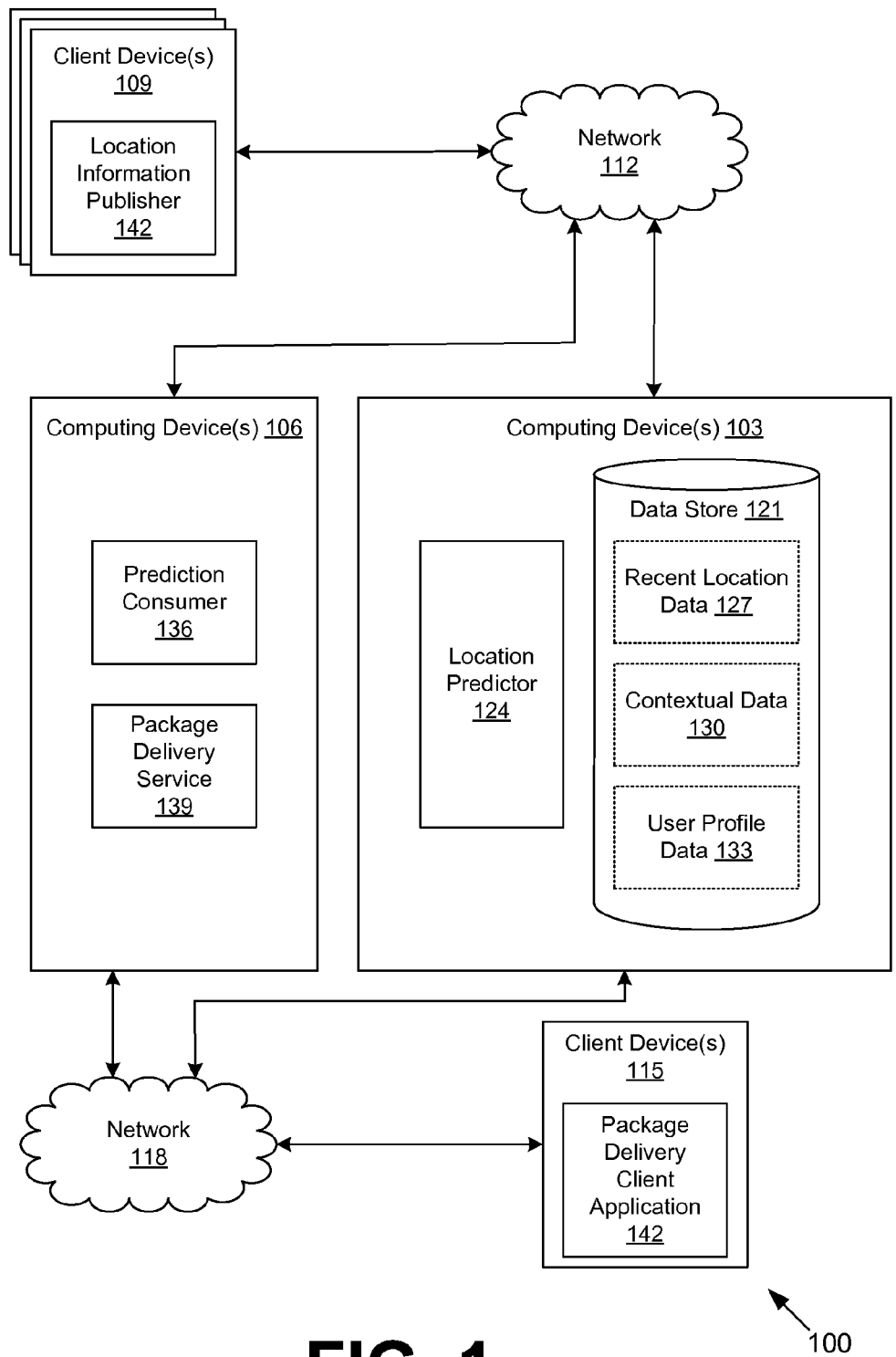
FIG. 1 is a drawing of a networked environment according to various embodiments of the present disclosure.

With reference to FIG. 1, shown is a networked environment 100 according to various embodiments. The networked environment 100 includes one or more computing devices 103 and one or more computing devices 106 in data communication with one or more client devices 109 by way of a network 112. The computing devices 103 and 106 are also in data communication with one or more client devices 115 by way of a network 118. The networks 112 and 118 include, for example, the Internet, intranets, extranets, wide area networks (WANs), local area networks (LANs), wired networks, wireless networks, or other suitable networks, etc., or any combination of two or more such networks.

The computing device 103 or 106 may comprise, for example, a server computer or any other system providing computing capability. Alternatively, a plurality of computing devices 103 or 106 may be employed that are arranged, for example, in one or more server banks or computer banks or other arrangements. A plurality of computing devices 103 or 106 together may comprise, for example, a cloud computing resource, a grid computing resource, and/or any other distributed computing arrangement. Such computing devices 103 or 106 may be located in a single installation or may be distributed among many different geographical locations. For purposes of convenience, the computing device 103 or 106 is referred to herein in the singular. Even though the computing device 103 or 106 is referred to in the singular, it is understood that a plurality of computing devices 103 or 106 may be employed in the various arrangements as described above.

Various applications and/or other functionality may be executed in the computing device 103 according to various embodiments. Also, various data is stored in a data store 121 that is accessible to the computing device 103. The data store 121 may be representative of a plurality of data stores as can be appreciated. The data stored in the data store 121, for example, is associated with the operation of the various applications and/or functional entities described below.

The components executed on the computing device 103, for example, include a location predictor 124. The location predictor 124 is executed to predict the location of mobile users of client devices 109, and provide this predicted location to applications executing on a computing device 106. The components executed on the computing device 103 may also include other applications, services, processes, systems, engines, or functionality not discussed in detail herein. The data stored in the data store 121 includes data accessed by the location predictor 124, for example, recent location data 127, contextual location data 130, and mobile user profiles 133, as well as potentially other data.

The components executed on the computing device 106, for example, include a prediction consumer 136 and a package delivery service 139. The prediction consumer 136 is executed to receive predicted locations of mobile users from the location predictor 124. The package delivery service 139 is executed to arrange package deliveries to mobile users, in cooperation with the location predictor 124 and the prediction consumer 136.

In various embodiments, the location predictor 124 and the prediction consumer 136 may utilize any type of middleware framework to communicate with each other or with an application executing on a client device 109 or 115. Examples of such frameworks include remote procedure calls, service-oriented architecture protocol (SOAP), representational state transfer (REST), Windows Communication Foundation, and other frameworks.

The client device 109 or 115 is representative of a plurality of client devices that may be coupled to the network 118. The client device 109 or 115 may comprise, for example, a processor-based system such as a computer system. Such a computer system may be embodied in the form of a desktop computer, a laptop computer, a personal digital assistant, a cellular telephone, a portable navigation system, a set-top box, a music player, a video player, a media player, a web pad, a tablet computer system, a game console, or other devices with like capability.

The client device 109 may be configured to execute various applications such as a location information publisher 142 and/or other applications. The location information publisher 142 may be executed in the client device 109 to provide recent location information and planned future location information to a location predictor 124 executing on the computing device 103. The client device 109 may be configured to execute other applications such as, for example, browsers, email applications, instant message applications, navigation applications, and/or other applications.

The client device 115 may be configured to execute various applications such as a package delivery client application 145 and/or other applications. The package delivery client application 145 may be executed in the client device 115 to initiate a package delivery to a mobile user, where the mobile user who is the delivery target provides location updates through another client device 109. The client device 115 may be configured to execute other applications such as, for example, browsers, email applications, instant message applications, navigation applications, and/or other applications.

Next, a general description of the operation of the various components of the networked environment 100 is provided. To begin, a user interacts with the location information publisher 142 to register himself with the location predictor 124 executing on the computing device 103. A registered user can elect to receive package delivery from one or more package delivery agents, where the agent utilizes the package delivery service 139 executing on the computing device 106.

At some time after registration, the location information publisher 142 sends a recent location of the client device 109 to the location predictor 124. The recent location may be provided automatically on a periodic basis, or the location predictor 124 may query the location information publisher 142. The location predictor 124 stores at least a portion of the received data as recent location data 127.

Another user interacts with the package delivery client application 145 executing on the client device 115 to initiate delivery of a package to the registered mobile user. The package delivery client application 145 provides the package delivery service 139 with the identity of the mobile user who is the delivery target, and provides details about the package, about delivery options, and about the identity of the user who is acting in the role of shipper.

The location predictor 124 uses recent location data 127 for the particular user, in conjunction with past location information, to predict probable locations of the mobile user of the client device 109 at one or more future times. In predicting the probable future location(s), the location predictor 124 may use various other forms of contextual location information 130, such as planned future locations according to the user's calendar appointments. This contextual location information 130 may be used instead of, or in addition to, the recent location data 127.

The location predictor 124 provides the predicted location(s) to a prediction consumer 136. The prediction consumer 136 in turn provides the predicted location(s) to the package delivery service 139 executing on the computing device 106. The package delivery service 139 then determines a vehicle and a route for that vehicle, and dispatches the vehicle to deliver the package to the registered target user at the predicted location.

Figure 2:
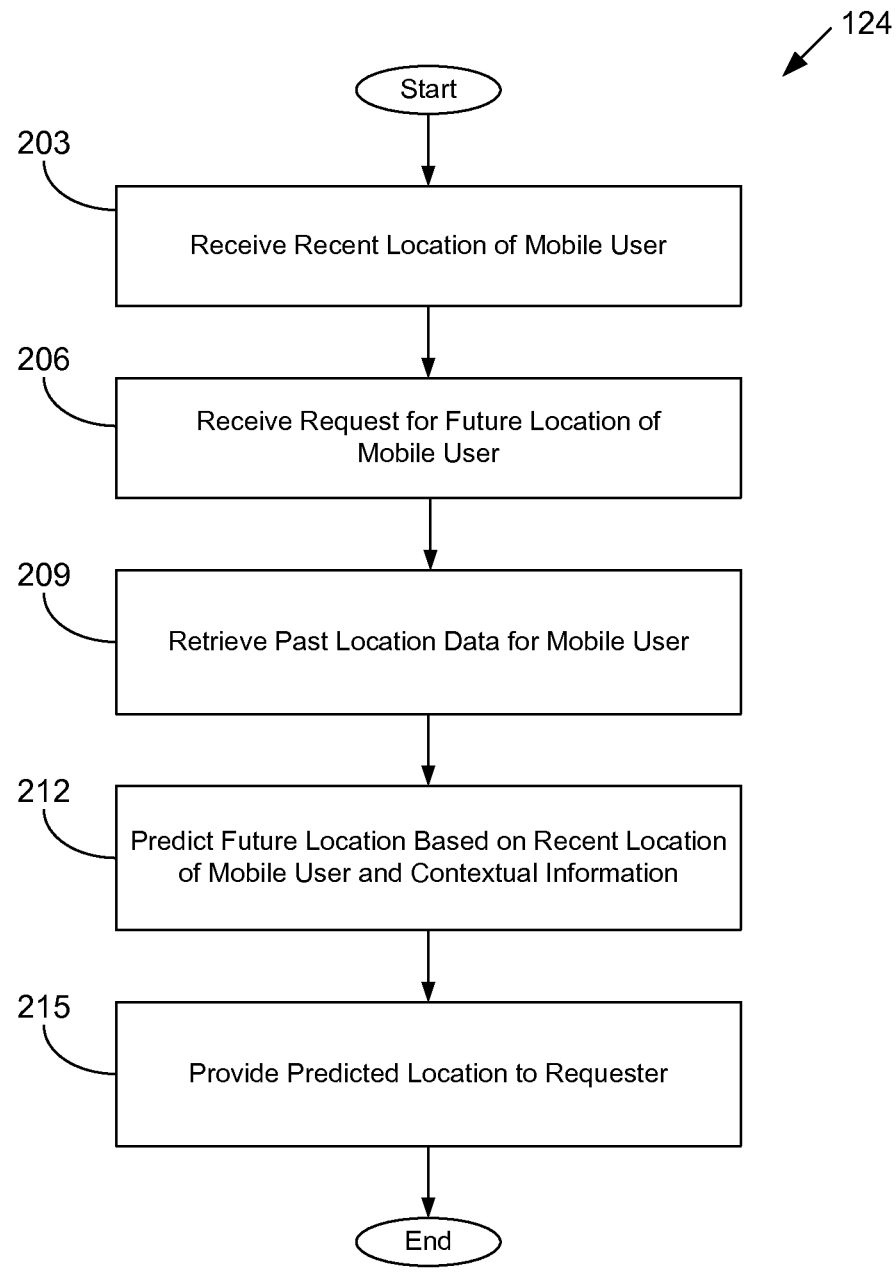
FIG. 2 is a flowchart illustrating one example of functionality implemented as portions of a location predictor application executed in a computing device in the networked environment of FIG. 1 according to various embodiments of the present disclosure.

Referring next to FIG. 2, shown is a flowchart that provides one example of the operation of a portion of the location predictor 124 according to various embodiments. It is understood that the flowchart of FIG. 2 provides merely an example of the many different types of functional arrangements that may be employed to implement the operation of the portion of the location predictor 124 as described herein. As an alternative, the flowchart of FIG. 2 may be viewed as depicting an example of steps of a method implemented in the client device 109 (FIG. 1) according to one or more embodiments.

Beginning at box 203, the location predictor 124 receives the recent location of the user from the client device 109 associated with the user. This recent location is provided by the location information publisher 142 which is executing on the client device 109. The location information may take the form of global positioning system (GPS) coordinates, a street address (e.g., number, street, and zip code), or any other suitable format. A series of updates as to the recent location allows the location predictor 124 to track or monitor the user's location over time. As updates are received, old information is stored as past location data in contextual location data 130, and the more recent location is stored as recent location data 127.

Next, at box 206, the location predictor 124 receives a request to provide a prediction of the user's location at a future time. At box 209, the location predictor 124 retrieves past location data as a form of contextual location data 130. At box 212, the location predictor 124 uses the past location data in conjunction with the most recent location to predict the user's location at the requested future time. The prediction in box 212 uses statistical techniques such as regression analysis or other appropriate techniques. Next, at 215 the location predictor 124 satisfies the request received in box 206 by providing the prediction to the requester. The process of FIG. 2 is then complete. Under some conditions, the prediction logic in box 212 may determine that a prediction cannot be made with a predefined level of confidence, and in such cases the location predictor 124 returns an indication to the requester that no prediction was made.

Figure 3:
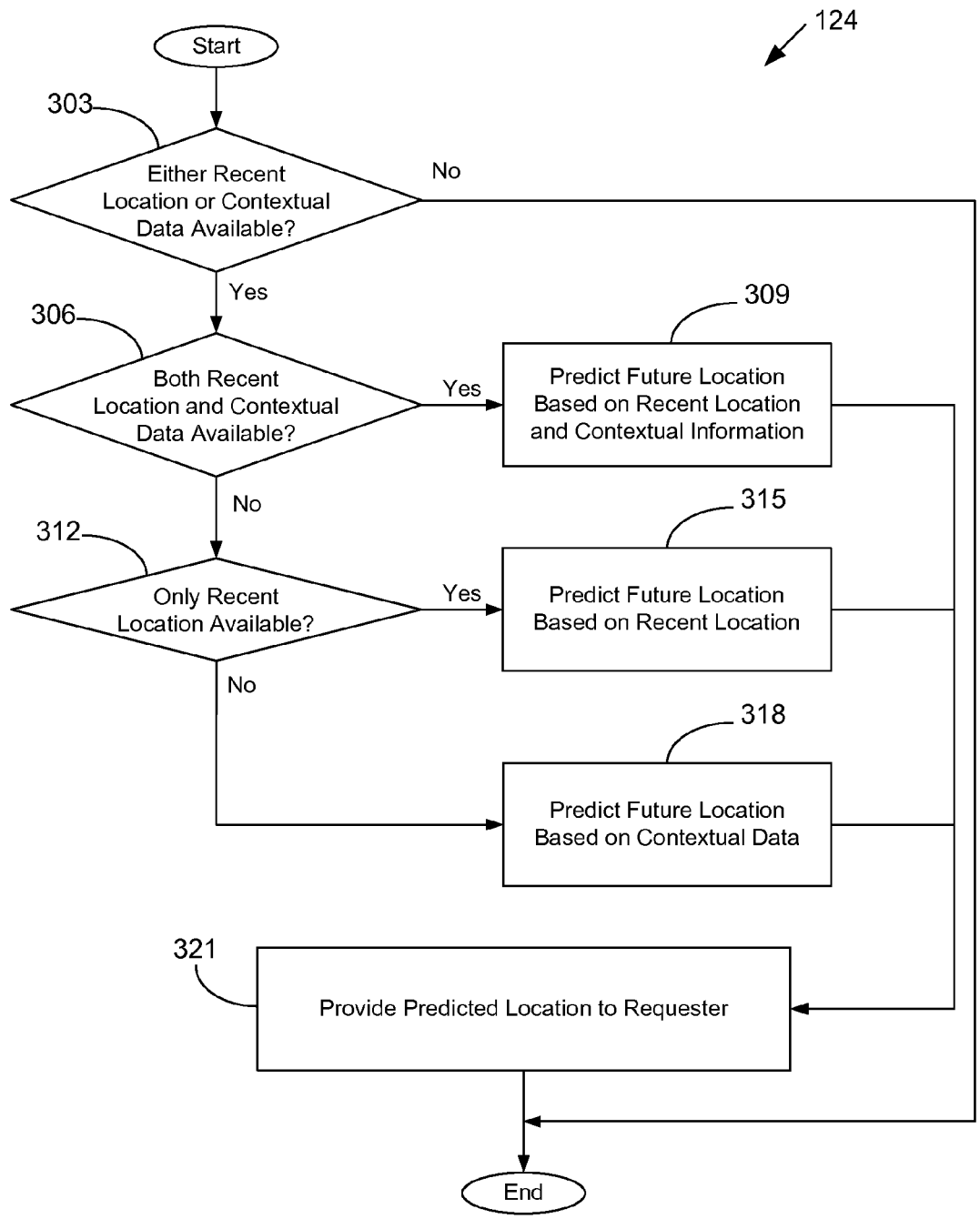
FIG. 3 is a flowchart illustrating another example of functionality implemented as portions of a location predictor application executed in a computing device in the networked environment of FIG. 1 according to various embodiments of the present disclosure.

With reference now to FIG. 3, shown is a flowchart that provides another example of the operation of a portion of the location predictor 124 according to various embodiments. It is understood that the flowchart of FIG. 3 provides merely an example of the many different types of functional arrangements that may be employed to implement the operation of the portion of the location predictor 124 as described herein. As an alternative, the flowchart of FIG. 3 may be viewed as depicting an example of steps of a method implemented in the client device 109 (FIG. 1) according to one or more embodiments.

The embodiments described by the flowchart of FIG. 2 utilize both recent location data 127 and past location data, which is a specific form of contextual location data 130. The embodiments described by the flowchart of FIG. 3 determine which type of data is available and use one or both types as appropriate. Before discussing the flow of these embodiments, various forms contextual data 130 will be discussed.

One example of contextual location data 130 is information about planned future locations for the user. Planned future locations may include, for example, appointments or scheduled events obtained from the user's calendar, trip itineraries obtained from an online trip planning or travel service, and other types of information about planned future locations. Another example of information used in making a prediction is a particular mode of transportation (e.g., car, bus, rail, walking, etc.) that is being used, or is likely to be used, by the mobile user. Current traffic and congestion patterns are examples of other information that can be used by the location predictor 124 to make a prediction about a mobile user's future location.

Another form of contextual data 130 is the type or category of the recent location to predict how long the user will stay at a particular location. For example, if the recent location corresponds to a restaurant, the location predictor 124 may predict that the user will stay at that location for one to two hours, and if the recent location corresponds to a movie theater, the location predictor 124 may predict that the user will stay for two to three hours. The location predictor 124 may use a geographic information service such as Google® Maps to obtain category information about the recent location.

Another type of contextual location data 130 is the particular time of day, which can be used in predicting the duration of the mobile user's stay at a particular location. For example, if the recent location is the user's office building, the location predictor 124 may predict that the user will be present at that location during work hours that are associated with the particular user. The user profile 133 may be used to store the user's home location, office location, work hours, etc.

Other types of contextual location data 130 are the recent location and past location of a proxy user. For example, the user profile 133 may list one or more proxy users who are associated with the user, for example, a spouse, a co-worker, etc. The location predictor 124 may use location information for the proxy user when, for example, not enough information is available for the actual user to make a confident prediction. The proxy user's location data may be collected and stored in recent location data 127 and past location data 130 after the proxy user registers with the location predictor 124. A user may specifically identify proxy users. A list of potential proxies may also be identified automatically, for example, by scanning social network websites that the user has an account with, where these social networks are stored as part of the user profile 133.

Having discussed various examples of contextual location data 130, the overall flow of FIG. 3 will now be described. Beginning at box 303, the location predictor 124 determines whether recent location data 127 and/or contextual location data 130 is available. If neither type of data is available, the processing for location predictor 124 is complete. If, however, it is determined in box 303 that one or both of these types of data is available, processing continues at box 306. At box 306, the location predictor 124 determines whether both types of data (recent location data 127 and contextual location data 130) are available. If it is determined at box 306 that both types of data are available, processing continues at box 309. At box 309, the location predictor 124 makes a prediction of the mobile user's future location based on both the recent location data 127 and the contextual location data 130. The prediction is made using statistical techniques such as regression analysis, or other appropriate techniques. Processing continues next at box 321, which is discussed below.

Returning to box 306, if it is determined at box 306 that one, but not both, types of data are available, processing continues at box 312. At box 312, the location predictor 124 determines whether the type of data that is available is recent location data 127. If at box 312 it is determined that recent location data 127, rather than contextual data 130, is available, processing continues at box 315. At box 315, the location predictor 124 makes a prediction of the mobile user's future location based on the recent location data 127. The prediction is made using statistical techniques such as regression analysis, or other appropriate techniques. Processing continues next at box 321, which is discussed below.

Returning to box 312, if it is determined at box 312 that the type of location data that is available is contextual location data 130, processing continues at block 318. At box 318, the location predictor 124 makes a prediction of the mobile user's future location based on the contextual location data 130. The prediction is made using statistical techniques such as regression analysis, or other appropriate techniques. Processing continues next at box 321, which is discussed below.

The location predictor 124 moves to box 321 after making a prediction of future location in box 309, 315, or 318. At box 321, the location predictor 124 provides the prediction to a requester or subscriber. Processing for the location predictor 124 is then complete.

Figure 4:
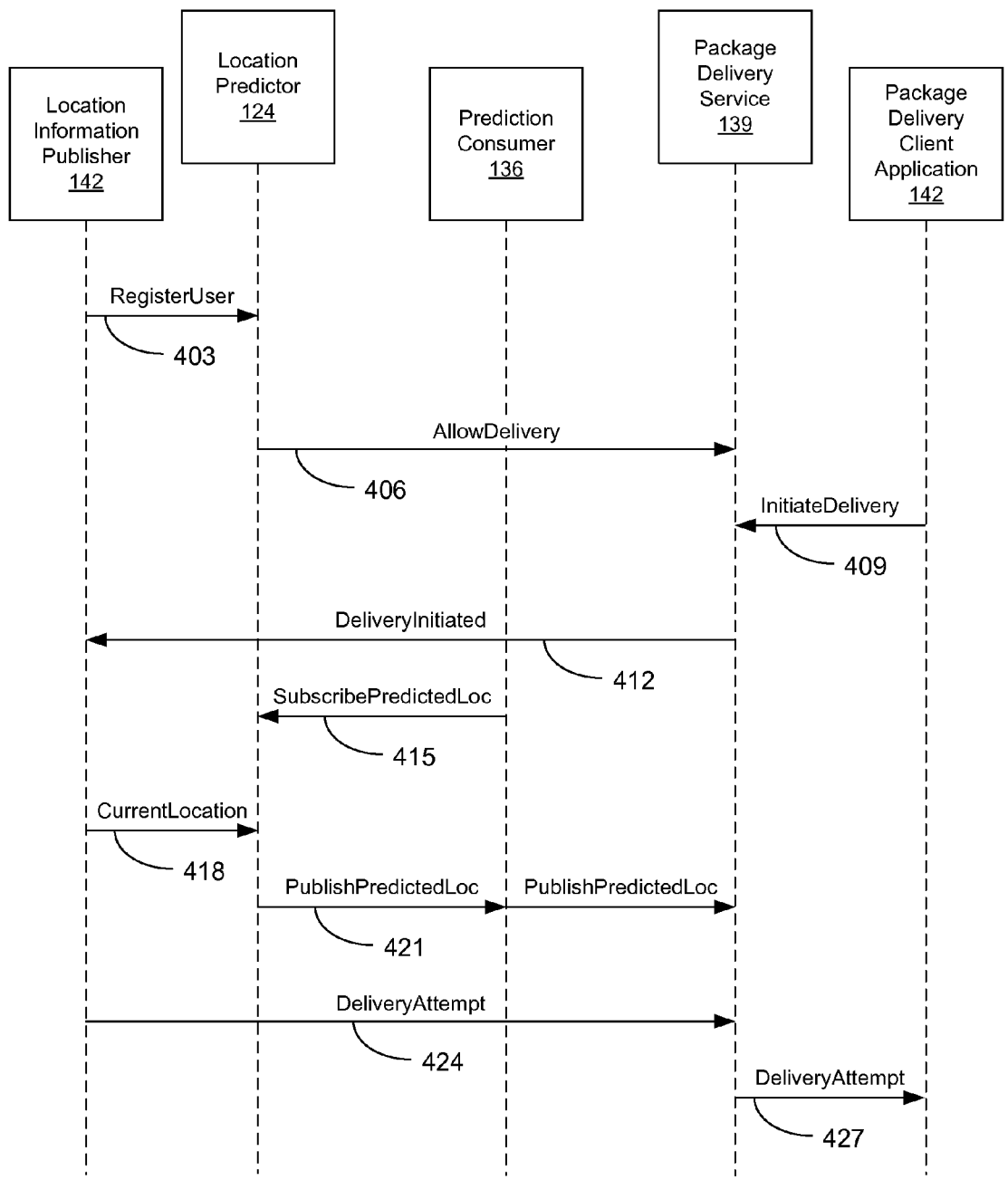
FIG. 4 is a diagram illustrating interactions between various components of the networked environment of FIG. 1 according to various embodiments of the present disclosure.

Turning now to FIG. 4, shown is a messaging diagram that provides one example of how the location predictor 124 interacts with various other components of FIG. 4. It is understood that the diagram of FIG. 4 provides merely an example of the many different types of functional arrangements that may be employed to implement the operation of the portion of the location predictor 124 as described herein. As an alternative, the diagram of FIG. 4 may be viewed as depicting an example of steps of a method implemented in the computing device 103 (FIG. 1) according to one or more embodiments.

The components shown in FIG. 4 include the location information publisher 142, the location predictor 124, the prediction consumer 136, and the package delivery service 139. The scenario shown in FIG. 4 begins when the location information publisher 142 registers a mobile user with the location predictor 124, at step 403. The registration enables the location information publisher 142 to provide location updates for the mobile user to the location predictor 124. The registration process may provide the mobile user with various options to control sharing of location updates, such that a mobile user shares the updates with any interested subscriber, with a subset of subscribers, etc.

At step 406 the mobile user interacts with the package delivery service 139 to allow future delivery of packages from one or more package delivery agents. Next, at step 409, the package delivery client application 145 communicates with the package delivery service 139 to initiate a package delivery to a registered mobile user on behalf of a package sender. The package sender identifies the mobile user who is the delivery target and provides information about the package to be delivered. The package sender may also select from various delivery times which may differ in price.

Responsive to the initiation of a package delivery to a mobile user at step 409, the package delivery service 139 notifies the mobile user that a package delivery has been initiated at step 412. At this time, the mobile user may notify the package delivery client application 145 that delivery is permitted during specific windows of time, or is permitted any time. In response to the package delivery initiation at step 309, the prediction consumer 146 subscribes to updates of the mobile user's predicted location at step 315.

At step 418 the location information publisher 142 receives one or more updates to the mobile user's recent location. The recent location coordinates may be obtained from a geographic positioning system (GPS) within the mobile user's client device 109. Alternatively, the recent location coordinates may be provided by a GPS system located in a vehicle in which the mobile user is traveling. As another option, the client device 109 may provide a street address and a mapping service such as Google® Maps to translate the street address to GPS coordinates.

At step 421 the location information publisher 142 determines a predicted location of the registered mobile user at a future time and publishes this information to subscribers such as the prediction consumer 136. The prediction consumer 136 forwards this information to the package delivery service 139. At step 424 the package delivery service 139 decides that delivery at a particular predicted location and time is appropriate, and dispatches a vehicle with the package. The package delivery service 139 may use a number of different algorithms to make this determination and to dispatch an appropriate vehicle. At step 424 the package delivery service 139 notifies the mobile user and/or the shipper that delivery is being attempted at a particular time and location. In response to the notification of step 424, the mobile user may provide a more specific update of his predicted location, which is received by the location predictor 124 and forwarded to the package delivery service 139.

At step 427 the package delivery service 139 notifies the shipper that delivery was or was not successful. If the delivery was not successful, the package delivery service 139 may attempt another delivery using additional predicted locations provided by the location information publisher 142, as the publisher in turn receives recent location updates from the mobile user.

Although the scenario shown in FIG. 4 involves delivery of a single package, the package delivery service 139 may coordinate delivery of different items. In this manner, items can be delivered at the same time, within a certain time period, in a particular order, etc.

Although the scenario shown in FIG. 4 involves a single package delivery service 139, multiple delivery services may be supported. In such cases, another service or system may coordinate the various delivery services, including keeping track of delivery vehicles from different services. A coordinating service may provide a mechanism to export delivery data, such that delivery of a particular package may be passed from one delivery service to another. A pricing system may utilize configurable pricing rules for each delivery service, and may keep track of costs and billing for each service. The pricing system may provide updated cost estimates during the delivery process.

Figure 5:
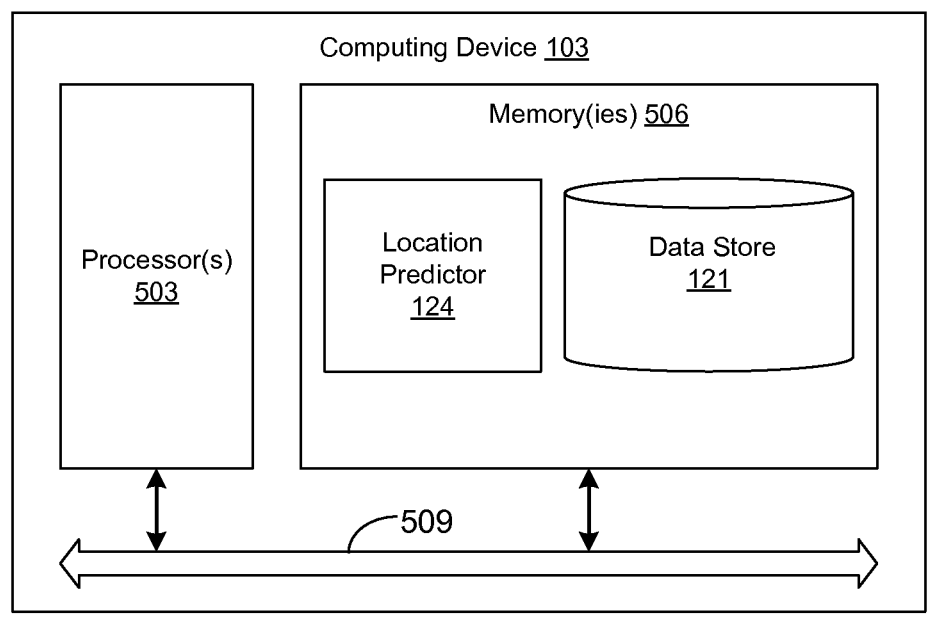
FIG. 5 is a schematic block diagram that provides one example illustration of a computing device employed in the networked environment of FIG. 1 according to various embodiments of the present disclosure.

Moving on to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the location predictor 124, and potentially other applications. Also stored in the memory 506 may be a data store 121 and other data. In addition, an operating system may be stored in the memory 506 and executable by the processor 503. While not illustrated, the computing device 106 also includes components like those shown in FIG. 5, whereby the prediction consumer 136 and the package delivery service 139 are stored in a memory and executable by a processor. Similarly, although not illustrated, the client device 109 and the client device 115 also include components like those shown in FIG. 5, where by the package delivery client application 145 and the location information publisher 142 are stored in a memory and executable by a processor.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 112 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the location information publisher 142, the location predictor 124, the package delivery service 139, the package delivery client application 145, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The diagrams of FIGS. 2, 3, and 4 show the functionality and operation of an implementation of portions of the location information publisher 142, the location predictor 124, the package delivery service 139, and the package delivery client application 145. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the diagrams of FIGS. 2, 3, and 4 show a specific order of execution, it is understood that the order of execution may differ from that which is depicted. For example, the order of execution of two or more blocks may be scrambled relative to the order shown. Also, two or more blocks shown in succession in FIGS. 2, 3 and 4 may be executed concurrently or with partial concurrence. Further, in some embodiments, one or more of the blocks shown in FIGS. 2, 3, and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including location information publisher 142, the location predictor 124, the package delivery service 139, and the package delivery client application 145, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

For the Examiner's convenience, Applicants note that this application is a continuation of U.S. application Ser. No. 13/952,979 and U.S. application Ser. No. 12/884,726. The claims of the present application are different and possibly, at least in some aspects, broader in scope than the claims pursued in the parent applications. To the extent any prior amendments or characterizations of the scope of any claim or cited document made during prosecution of the parent applications could be construed as a disclaimer of any subject matter supported by the present disclosure, Applicants hereby rescind and retract such disclaimer. Accordingly, the references previously presented in the parent applications may need to be revisited.

The invention claimed is:

1. A non-transitory computer-readable medium embodying a program executable in a computing device, comprising:
   code that receives a registration from a mobile user, the registration associated with a package delivery service;
   code that notifies the package delivery service of the registration;
   code that receives an update of a recent location associated with the mobile user;
   code that receives, from a subscriber, a request for a subscription for updates to the recent location of the mobile user, the subscriber being associated with the package delivery service;
   code that, responsive to receiving the recent location and the request for the subscription, notifies the subscriber of the recent location of the mobile user;
   code that generates a predicted future location of the mobile user at a future time based at least in part on the recent location; and
   code that initiates delivery of a package shipped via the package delivery service to the mobile user based at least in part upon the predicted future location of the mobile user at the future time.

2. The non-transitory computer-readable medium of claim 1, wherein the recent location comprises geographic positioning system (GPS) coordinates associated with a client device associated with the mobile user.

3. The non-transitory computer-readable medium of claim 1, wherein the predicted future location is further based at least in part upon past location data for the mobile user, the past location data comprising a location update that is older than the update of the recent location.

4. The non-transitory computer-readable medium of claim 1, wherein the code that generates the predicted future location is based at least in part upon information about planned future locations of the mobile user.

5. A system, comprising:
at least one computing device; and
a location predictor executable in the at least one computing device, the location predictor comprising:
logic that receives an update of a recent location associated with a mobile user from a client device;
logic that generates a predicted future location of the mobile user at a future time based at least in part on the recent location and past location data for the mobile user, wherein the past location data comprises a location update that is older than the update of the recent location; and
logic that initiates delivery of a package associated with the mobile user to the predicted future location.

6. The system of claim 5, wherein the logic that generates the predicted future location generates the predicted future location based at least in part upon a category of the recent location.

7. The system of claim 5, wherein the logic that generates the predicted future location generates the predicted future location based at least in part upon a current time of day.

8. The system of claim 5, wherein the logic that generates the predicted future location generates the predicted future location based at least in part upon at least one planned future location of the mobile user.

9. The system of claim 5, wherein the logic that generates the predicted future location generates the predicted future location based at least in part upon location information for a proxy user.

10. The system of claim 5, wherein the recent location comprises geographic positioning system (GPS) coordinates associated with the client device.

11. The system of claim 5, wherein the recent location comprises a street address.

12. The system of claim 5, wherein the location predictor further comprises logic that receives a selection of a preference from the mobile user which authorizes sharing of the predicted future location to a package delivery service.

13. A method, comprising:
determining, by at least one computing device, availability of recent location data of a client device associated with a mobile user;
determining, by the at least one computing device, availability of contextual location data for the mobile user; and
generating, by the at least one computing device, a predicted future location of the mobile user at a future time based at least in part upon the recent location data and the contextual location data.

14. The method of claim 13, further comprising:
obtaining, by the at least one computing device, a query for the predicted future location; and
responsive to the query, providing, by the at least one computing device, the predicted future location.

15. The method of claim 14, further comprising obtaining, by the at least one computing device, a query for the predicted future location, wherein the generating is performed responsive to obtaining the query.

16. The method of claim 13, further comprising:
obtaining, by the at least one computing device, a request to subscribe to predictions of the predicted future location of the mobile user; and
responsive to generating the predicted future location of the mobile user, providing, by the at least one computing device, the predicted future location to the subscriber.

17. The method of claim 16, wherein the request is received from a computing device associated with a package carrier.

18. The method of claim 13, further comprising initiating, by the at least one computing device, delivery of a package associated with a package delivery service to the predicted future location.

19. The method of claim 18, further comprising obtaining, by the at least one computing device, an indication of a window of time for delivery of the package to the predicted future location, the indication being received from the client device associated with the mobile user.

20. The method of claim 13, wherein the contextual location data includes at least one of: a category of the recent location data, a current time of day, at least one planned future location of the mobile user, a calendar associated with the mobile user, at least one appointment associated with the mobile user, or location information for a proxy user.

* * * * *

UNITED STATES PATENT AND TRADEMARK OFFICE
CERTIFICATE OF CORRECTION

PATENT NO. : 9,123,014 B1
APPLICATION NO. : 14/258543
DATED : September 1, 2015
INVENTOR(S) : David James Roy Erdmann et al.

Page 1 of 1

It is certified that error appears in the above-identified patent and that said Letters Patent is hereby corrected as shown below:

IN THE SPECIFICATION

Column 6, lines 64 and 65:
- "geographic positioning system" should be changed to "global positioning system"

IN THE CLAIMS

Column 10, lines 60 and 61:
- "geographic positioning system" should be changed to "global positioning system"

Column 11, line 37:
- "geographic positioning system" should be changed to "global positioning system"

Signed and Sealed this
Twenty-second Day of March, 2016

Michelle K. Lee
*Director of the United States Patent and Trademark Office*